March 4, 1952  J. J. BLACK  2,588,078
FOUR WHEEL TRAILER VEHICLE
Filed Nov. 10, 1947  3 Sheets-Sheet 1
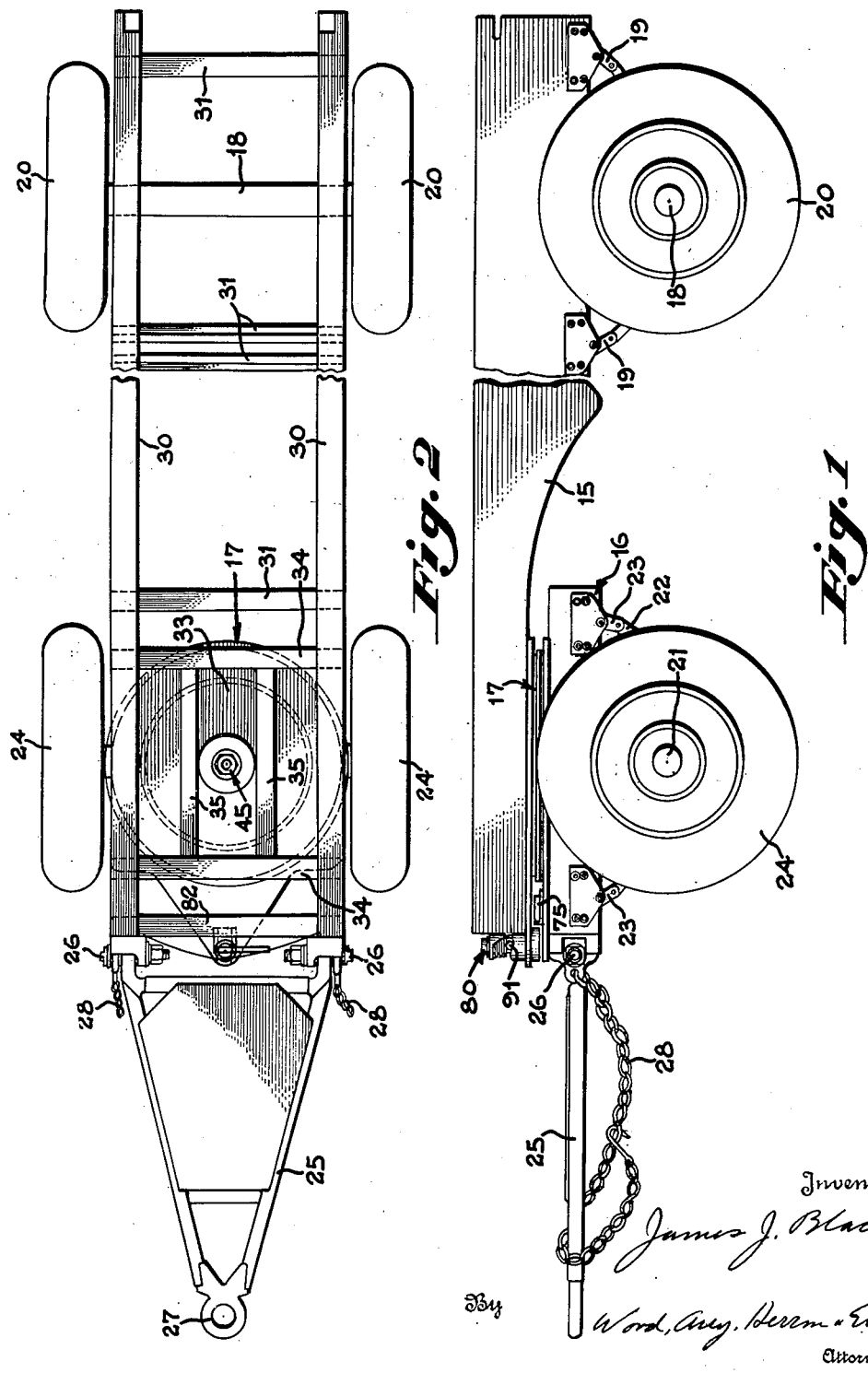

March 4, 1952 J. J. BLACK 2,588,078
FOUR WHEEL TRAILER VEHICLE
Filed Nov. 10, 1947 3 Sheets-Sheet 2

Inventor
James J. Black
By
Wood, Arey, Herron & Evans
Attorneys

Inventor
James J. Black

Patented Mar. 4, 1952

2,588,078

UNITED STATES PATENT OFFICE 2,588,078

FOUR WHEEL TRAILER VEHICLE

James J. Black, Cincinnati, Ohio, assignor, by mesne assignments, to Trailmobile Inc., a corporation of Delaware Application November 10, 1947, Serial No. 784,998

7 Claims. (Cl. 280—125)

This invention relates to trailer vehicles and is particularly directed to improvements in the undercarriage and fifth wheel structure of trailers of the four wheel class, as distinguished from two wheeled semi-trailers. The four wheel trailer constitutes a self supporting vehicle, the entire weight load being carried upon the trailer wheels, whereas in the semi-trailer, the load is divided between the tractor and the trailer rear wheels.

The present improvements are embodied in a trailer chassis or frame having rear wheels journalled on a fixed axle, and front wheels journalled on a pivotal undercarriage or dolly. A fifth wheel assembly is interposed between the dolly and chassis to support the forward end of the trailer. Extending forwardly from the dolly is a draw bar by means of which a draft connection is established with a towing vehicle such as a tractor, truck or passenger car, depending on the size and design of the trailer. Suitable coupling apparatus of standard usage is employed to couple the end of the draw bar to the towing vehicle.

The trailer frequently is towed at high speeds over rough roads. Therefore, the fifth wheel assembly, which bears much of the load and draws and guides the forward end of the trailer, is subjected to rough usage. Shocks, stresses and vibrations occur which are transmitted to the fifth wheel assembly, tending to cause excessive wear and looseness. Any appreciable degree of looseness is undesirable since it causes noise and sets up a tendency for the trailer to weave or oscillate relative to the towing vehicle. This condition may render the vehicle unmanageable and lead to accidents at high speeds.

It has been a primary object of the inventor to provide a fifth wheel assembly having a load bearing ring formed of a tough non-metallic material supported in bearing engagement upon a smooth metal plate in the presence of a lubricant to reduce friction and wear to a minimum thereby to prolong the life and improve the performance of the trailer.

This is accomplished by providing an upper and lower fifth wheel plate with a load bearing ring, in the form of arcuate non-metallic segments, secured to the upper plate and slidable relative to the lower. This ring is enclosed between inner and outer closure rings which provide an annular lubricant space on each side of the load bearing ring. These closure rings are secured to the lower fifth wheel plate and gaskets are employed to seal the load bearing ring relative to the closure rings. Thus a supply of lubricant may be maintained in contact with the bearing ring and the ring is sealed against dust and grit.

A further object has been to provide a vibration and noise damping structure which substantially insulates the towing vehicle from the trailer as to vibration and noise, to promote comfort and minimize driver fatigue. This has been achieved by providing cushioning means between the trailer and dolly and between the dolly and towing vehicle. Vibrations are insulated vertically by the sealing gaskets above noted, which are of somewhat pliable material interposed between the load bearing ring and ring mounting fifth wheel plate. In the horizontal direction, vibrations and shocks are absorbed by providing a resilient mounting between the draw bar and the dolly. Thus the undercarriage constitutes in effect a noise and vibration damping member between trailer and towing vehicle.

Still another object has been to promote ease of operation by the provision of a conveniently actuated latching device operable to latch the undercarriage or dolly in alignment with the trailer to cause the trailer, in backing, to track in a straight path. Ordinarily, backing a tractor-trailer unit is a difficult and tedious operation since the vehicles tend to "jackknife" and it requires considerable skill and practice successfully to execute the maneuver. The present structure permits the driver to back conveniently into restricted passageways or entrances by preliminarily lining up the towing vehicle and trailer with the passageway, then latching the undercarriage in fixed position in line with the trailer. With the undercarriage wheels latched in alignment, the trailer and towing vehicle track in a straight line into the passageway, in reverse gear, without effort on the driver's part.

Further objects and advantages of the invention will be more fully developed in the following detailed description with reference to the drawings in which:

Figure 1 is a general side elevation illustrating a trailer chassis incorporating the improved undercarriage and fifth wheel assembly.

Figure 2 is a top plan view as projected from Figure 1, further illustrating the structure.

Figure 3:
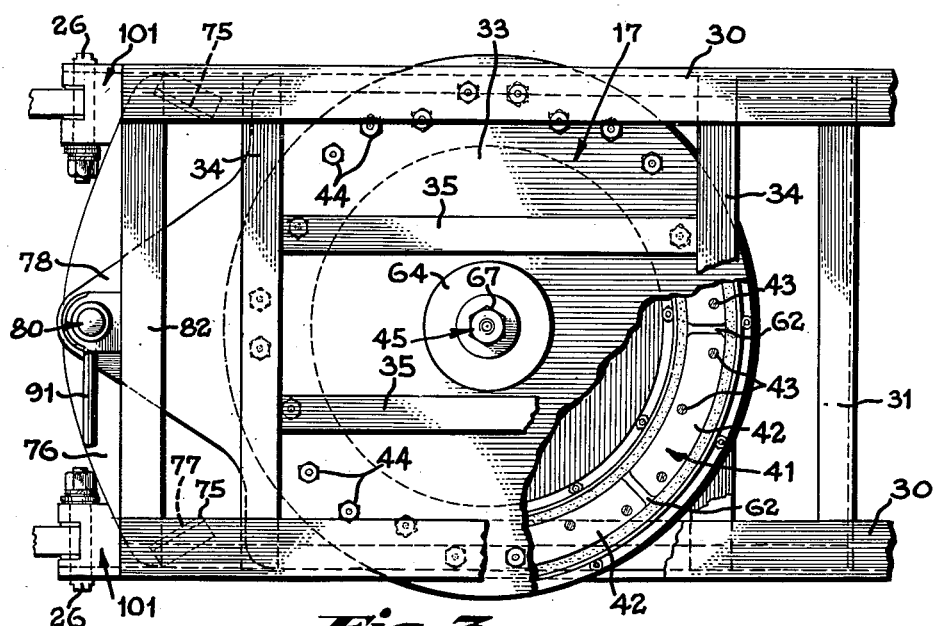
Figure 3 is a fragmentary enlarged top plan view of the forward portion of the vehicle partially broken away to illustrate the fifth wheel structure.

Generally described with reference to Figure 1, the trailer as illustrated, constitutes a chassis or frame generally indicated at 15 having its forward end mounted upon a dolly or undercarriage 16, by means of a fifth wheel assembly 17. The rearward end is carried upon an axle 18 mounted upon springs which are connected to the trailer frame by shackles 19 in the usual manner. A set of road wheels 20 is journalled upon the axle 18.

The dolly or undercarriage 16 likewise includes an axle 21 which supports the dolly by means of springs 22 connected thereto by spring shackles 23 likewise of standard construction. A set of road wheels 24 is journalled on axle 21 and the lower edge of the chassis, at its forward portion, is elevated to clear the wheels in negotiating sharp turns.

The forward end of the dolly 16 is provided with a draw bar 25, pivotally connected on opposite sides as at 26 to the ends of the side frame members of the dolly. The draw bar provides a connection between the dolly and the towing vehicle, and causes the dolly to follow the towing vehicle for which purpose the dolly is free to pivot relative to the trailer. Since the draw bar structure and coupling apparatus forms no part of the present invention, it is not deemed necessary to disclose in detail its specific construction. At the forward end of the draw bar is provided a coupling ring 27 designed to establish a coupling connection with a cooperating device mounted upon the towing vehicle. A pair of chains 28—28, connected at opposite sides of the dolly, provide a safety connection with the towing vehicle to prevent accidents should the coupling apparatus 27 fail. This arrangement likewise is commonly employed, and in many states is a requirement under state traffic codes.

Figure 4:
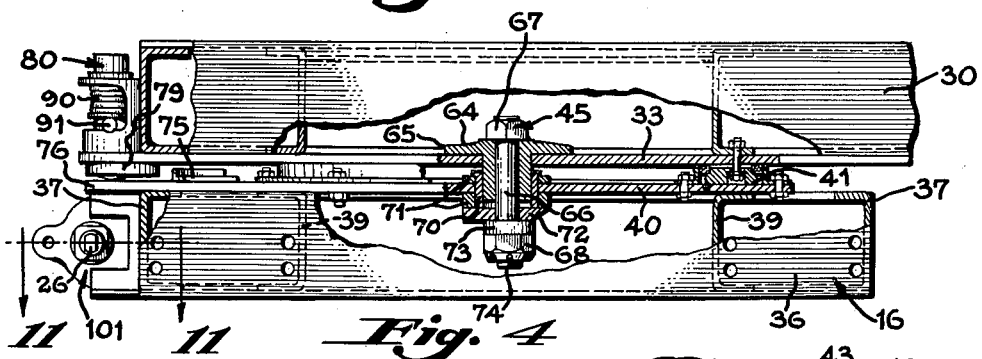

Referring to Figures 2, 3 and 4, the chassis or frame constitutes a pair of spaced longitudinal base channel members 30—30 joined by a series of cross rails 31 having their opposite ends riveted or welded to the longitudinal channel members. The upper fifth wheel assembly 17 comprises an upper fifth wheel plate 33 rigidly secured to the forward end of the chassis by means of cross channels 34—34 joined by a pair of intermediate longitudinal channels 35—35. The cross channels 34 are rigidly joined at opposite ends to the longitudinal base channels 30—30 preferably by welding, and the intermediate longitudinal channels 35—35 likewise are welded to the cross channels 34. The lower edges of the cross channels 34, the intermediate channels 35 and the base channels 30 are flush with each other to seat upon the fifth wheel 33, and the plate is secured to these members collectively so as to provide a rugged supporting structure for the trailer. It will be apparent that the cross rails 34 and intermediate longitudinal rails 35, combined with the base channels 30, distribute the load with substantial uniformity over the surface of the fifth wheel plate 33, to prevent undue concentration of forces and distortion of the plate.

The frame for the undercarriage or dolly 16 is constructed of a pair of spaced longitudinal side channels 36 spanned by cross channels 37—37 at the forward and rearward ends of the channels 36 as shown in Figure 4. These cross channels likewise are secured preferably by welding to the side channels 36 to form a rigid structure. Similar to the cross channels 34 of the upper fifth wheel plate 33, the dolly is provided with cross channels 39—39 parallel with the upper cross channels 34—34. Also, intermediate longitudinal rails (not shown) similar to the upper rails 35 may be butt welded flush with the cross channels 39. The cross channels 39 preferably are butt welded to the side members 36 so as to provide a flush upper surface for the reception of a lower fifth wheel plate 40. Fifth wheel plate 40, similar to the upper plate 33, is secured to the dolly frame preferably by welding to provide a rugged, integrated structure.

Figures 5, 6:
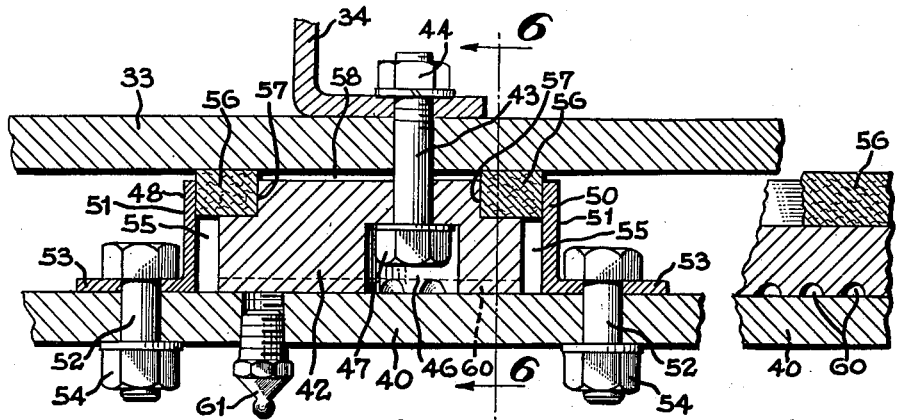

The weight load of the trailer is supported upon the dolly by means of a load bearing ring 41 formed of arcuate blocks 42 of a tough fibrous material, such as lignum vitae, hardwood, or a plastic composition having similar characteristics, Figure 5. This ring is interposed between the upper and lower fifth wheel plates 33 and 40 and the blocks are secured to the upper plates by means of bolts 43. These bolts pass through the blocks and upper plate and are secured by nuts 44 engaging the upper plate surface. The ring thus formed is fixed relative to the upper plate and is slidable relative to the lower plate so that as the dolly pivots the lower plate rotates relative to the bearing ring. The upper and lower fifth wheel plates are connected together by means of a king pin or pivot bolt 45, hereinafter described in detail, which maintains the plates radially in alignment so that the bearing ring 41 is free of radial forces and serves as a thrust bearing only. Plate 40 therefore constitutes a bearing surface slidable relative to the load bearing ring 41.

Referring to Figure 5 it will be noted that each of the blocks or shoes 42 are provided with counterbores 46 running upwardly from the lower surface of the blocks to accommodate the heads 47 of the bolts 43. This arrangement provides clearance between the bolt heads and the bearing surface of the lower plate 40.

It has been found that a tough non-metallic material such as hardwood or fibrous composition, properly lubricated and kept free of dust and grit, provides a smooth running, wear resistant bearing under heavy loads when arranged in sliding engagement upon a smooth metal surface. In order to maintain an abundant quantity of lubricant for the bearing ring, a pair of closure rings are provided respectively about the interior and the exterior circumference of the bearing ring 41. In the present instance these rings are fabricated from angle irons bent to form rings, the interior ring being indicated at 48 and the exterior ring at 50. The respective rings thus provide a vertical closure wall 51 spaced on opposite sides of the sealing ring and are securely mounted upon the lower fifth wheel plate 40 by means of bolts 52 extending through the horizontal web 53 of the angle irons (Figure 5). Nuts 54 bearing against the under surface of plate 40 mount the rings securely upon the plate. Since the plate 40 is rigidly attached to the dolly, the plate and ring assembly rotate relative to the bearing ring 41 when the dolly pivots in making a turn.

In order effectively to seal the lubricant reservoirs indicated at 55—55 on opposite sides between the closure walls 51 and the bearing ring, a pair of sealing rings or gaskets 56—56 is provided. These rings extend around the interior and exterior circumference of the bearing ring and are seated in right angular shoulders 57 formed in opposite corners of the bearing blocks. The gaskets preferably are cemented securely in these shoulders and the clamping effect of bolts 43 expands the gasket laterally into intimate sealing engagement with the closure rings. The sealing gaskets thus form a part of the load bearing ring clamped between the upper fifth wheel plate 33 and the bearing ring by the bolts 43. Therefore, the upper fifth wheel plate, bearing blocks and gaskets constitute an assembly movable as a unit relative to the lower fifth wheel plate 40 and seal rings 48 and 50. As shown in Figure 5 the bearing blocks are spaced from the fifth wheel plate as at 58 by the sealing gaskets. The gaskets being of pliable material thus serve as cushioning elements to insulate trailer vibration and noise from the fifth wheel assembly. It will be noted that the bearing ring is supplied with lubricant at all times, and also that the ring is sealed effectually against the entrance of grit and moisture so as to prevent undue wear, to reduce friction and to provide efficient performance.

In order to efficiently distribute lubricant, the bearing face of each bearing shoe 42 is provided with radial grooves 60 as illustrated in Figures 5 and 6. As shown, these grooves extend across the blocks and their opposite ends communicate with the lubricant reservoirs 55—55 at opposite sides of the ring. Adequate lubrication thus is insured for the full width of each shoe to reduce friction and wear and to promote a long life. In order to replenish the lubricant supply, a grease fitting 61 of commercial design, is installed in the lower plate, opening into the grooves 60. The grease supplied through the fitting is forced into the grooves and flows laterally, in opposite directions, to the grease reservoirs 55. If desired, a plurality of fittings 61 may be installed at spaced intervals around the circumference of the bearing ring.

It will be apparent that the upper and lower fifth wheel plates 33 and 40 are maintained in radial position relative to each other by the king pin 45 previously noted. Therefore the bearing block assembly is relieved of radial stresses and the closure rings 48 and 50 are guided accurately with respect to the bearing ring 41.

Figures 11, 12:
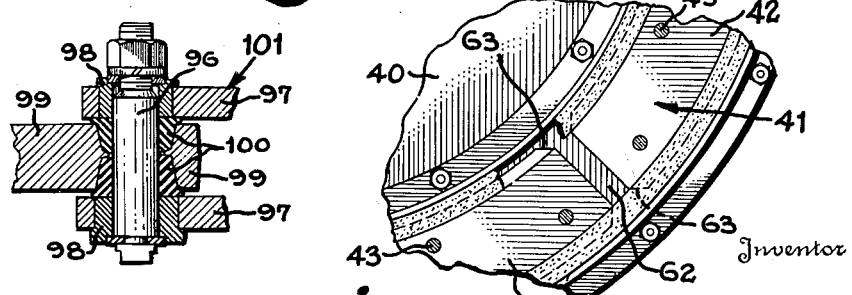
Figure 11 is a sectional view taken on line 11—11 Figure 4 detailing the shock absorbing coupling arrangement of the draw bar relative to the dolly.
Figure 12 is a fragmentary top plan view further illustrating on an enlarged scale, the arrangement of bearing block segments, sealing rings, and sealing gaskets for the bearing blocks.

As shown in Figures 3 and 12, the opposite ends of the respective segmental bearing blocks or shoes 42, making up the load bearing ring assembly, have their adjacent ends spaced as at 62, with the corners of the blocks chamfered as at 63. The spacing 62, of course, opens into the opposite lubricant reservoirs 55—55, and aids in distributing the lubricant equally on both sides of the ring. The sealing gaskets 56—56 extend across the spaced ends of the blocks so that the spacing does not interfere with proper sealing of the assembly. The spacing between the shoes 42 further facilitates the manufacture and assembly of the structure since the shoes need not be held within precision limits of tolerance in order to make up an accurate ring formation. Preferably the arcuate shoes are fabricated with the aid of suitable jigs at a production rate. It will be apparent that if the bores for the bolts 43 are accurately located, both in the shoes and in the upper fifth wheel plate 33, the ring assembly operation consists merely in applying and bolting the shoes in position. Minor irregularities in the contour of the ring radially will be compensated by the sealing rings 56 which preferably are of a somewhat resilient fibrous material such as a fabric or plastic composition.

Described in detail with reference to Figure 4 the king pin or pivot bolt assembly 45 comprises a sleeve 64, having a flange 65 at its upper end overlying and preferably welded to the upper fifth wheel plate 33. A bolt 66 extends through the bore of bushing 64 and includes nuts 67 and 68 at its upper and lower ends respectively. A sleeve 70 journalled upon the lower end of bushing 64 is secured, preferably by welding, to the lower fifth wheel plate 40. Spacer rings 71—71 are disposed on opposite sides of plate 40, properly to space the lower bushing 70. A collar 72 and washer 73 are disposed beneath the lower spacer ring 71 and the nut 68 bears against washer 73 to draw the assembly and the plates 33 and 40 toward each other. The lower nut 68 preferably is castellated and is locked relative to the bolt by a cotter pin 74. The upper and lower plates may be adjusted relative to each other by drawing up on the upper nut 67 should the assembly become worn after a period of service.

Since the thrust forces between the towing vehicle and the trailer are transmitted through the king pin assembly 45, the respective bearing bushings 64 and 70 preferably are fabricated from a tough, wear resisting grade of steel so as to embody sufficient strength and wear resistance to withstand shocks and heavy loads without danger of failure. It will be apparent that the bushing 64, being welded to plate 33, is stationary, while the lower bushing 70, which is journalled upon bushing 64, rotates upon bushing 64 when the dolly pivots.

By virtue of the flange 65 of bushing 64, the stresses are distributed so as to avoid excessive stresses in a concentrated area about the bushing 64. Since lower bushing 70 is centered vertically relative to the plate 40, there is little or no angular force applied to this bushing. In the case of the upper bushing, its lower end is subjected to angular stress in transmitting the draft thrust to the trailer and consequently must be sufficiently strong to withstand these forces without breakage.

As shown in Figures 3 and 4 the forward end of the dolly is provided with a pair of stops 75—75, one on each side of the dolly. These stops may be in the form of blocks or angle members welded to the upper surface of the forwardly extended portion 76 of the lower fifth wheel plate 40. The vertical webs 77 of the angle members extend upwardly into the plane of a limit block 79 secured by welding to a forwardly extending nose portion 78 of the upper fifth wheel plate. This block is engaged by the webs 77 when the dolly pivots to its limits of turning angle, and thus limits the turning radius, prevents making turns too short for safe operation, and prevents the tractor from swinging into contact with the trailer in maneuvering the vehicle.

As detailed in Figure 7 to 10 inclusive, the forward end of the trailer is provided with a latching device indicated generally at 80. The purpose of this device is to lock the dolly with its wheels in straight line relationship with the rear wheels to cause the trailer to follow a straight line of travel. The arrangement facilitates backing the trailer into building openings and other restricted passageways. In operation the driver positions his vehicle in alignment with the opening, then releases the latch to lock the dolly against pivotal movement with its front wheels in a straight position. Upon backing the towing vehicle the trailer and tractor will track in a straight line into the opening with which it is aligned, thereby avoiding the rather difficult feat of steering the tractor and trailer along a straight path in reverse gear.

Figures 8, 9, 10:
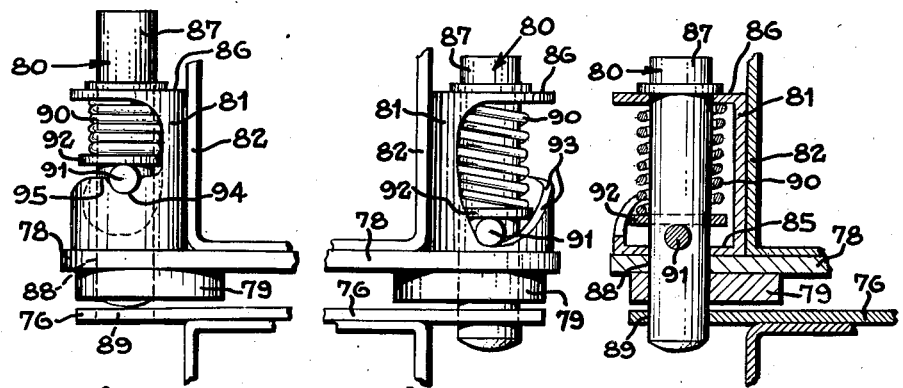
Figure 9 is a side elevation similar to Figure 8, illustrating the opposite side of the latch mechanism and showing the bolt lowered in latching position.
Figure 10 is a sectional view taken on line 10—10 Figure 7, further detailing the latching apparatus.

Described in detail, the latching device constitutes a cylindrical bracket 81, secured to a forward cross channel 82 with the lower end of the bracket seated upon and secured to the nose portion 78 of the upper fifth wheel plate 33. Bracket 81 includes lower and upper end plates 85 and 86 through which is slidably extended a latch bolt 87. The previously noted limit block 79, and, nose piece 78, include a bore 88, through which extends the lower end of the latch bolt. The forward extension 76 of lower plate 40 likewise is provided with a bore 89 which registers with bore 88 when the dolly is in alignment with the trailer. Thus the bolt may be lowered as shown in Figures 9 and 10 to engage and latch the lower plate relative to the upper, thereby preventing pivotal movement of the dolly.

The latch bolt is urged downwardly in latching position by means of a spring 90 in compression between the upper end plate 86 and a laterally extended actuating handle 91. A washer 92 is placed between the handle 91 and the lower end of spring 90.

Figure 7:
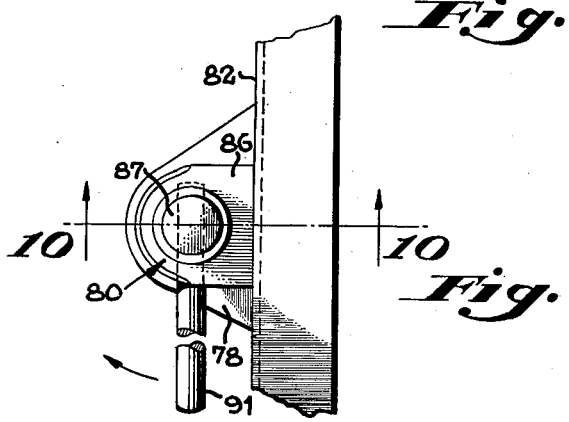

Actuating handle 91 extends outwardly beyond the bracket 81 and rests upon a spirally inclined edge 93 of the bracket. Edge 93 provides a cam surface for raising and lowering the latch bolt as shown in Figure 9. In order to raise and lower the bolt, handle 91 is rotated, causing it to follow the spiral edge 93 of the bracket to raise or lower the latch bolt relative to the bracket. As shown in Figures 7 and 8 the latch bolt is in its retracted or elevated position with the handle engaged in a recess 94 formed in a horizontal portion 95 of the edge 93. In this position the dolly is free to pivot and recess 94 locks the latch against accidental displacement. When it is desired to lower the bolt to its locking position, the handle is rotated in a clock-wise direction, as indicated by the arrow in Figure 7. This disengages the handle from recess 94 and causes it to ride down the spirally inclined edge 93 of the cam, thereby lowering the latch bolt by expansion of spring 90, as shown in Figures 9 and 10. In this position the lower end of latch bolt 87 extends downwardly through the limit block 79, into bore 89 of the extension 76 of lower plate 40, thus latching the dolly in fixed relationship with the trailer. The trailer then will track in a straight line.

When it is desired to retract the latch bolt, handle 91 is rotated in a counterclockwise direction, causing it to ride upwardly upon the spirally inclined edge 93, elevating the latch bolt against the compression spring 90. The handle is rotated approximately one-half turn to raise or lower the bolt. This arrangement permits the dolly to be latched and unlatched conveniently and quickly and the inclined edge 93 minimizes the effort required in compressing spring 90.

As illustrated in Figure 11, the draw bar 25 is connected to the dolly by means of a coupling bolt 96 extending through a pair of bushings 98—98 secured in legs 97—97 of mounting brackets 101. These brackets are secured at the opposite forward ends of the dolly (Figure 3). The rearward ends 99—99 of the draw bar are disposed between the arms 97 of the respective brackets and a flexible bushing 100, formed of rubber or similar material, surrounds the draw bolt 96. This arrangement cushions shocks and vibrations between the towing vehicle and dolly and aids in procuring smooth, quiet performance.

As previously noted, the load bearing ring assembly 41 insulates against vibrations between the dolly and trailer since the weight load of the trailer is imposed upon the fibrous packing rings 56. Therefore, the dolly or undercarriage acts to dampen noise and vibration between tractor and trailer. It has been found that the improved structure promotes ease of operation, provides smooth, quiet performance. Due to efficient lubrication, wear and maintenance is minimized and the period of useful service is lengthened appreciably.

Having described my invention, I claim:

1. A four wheel trailer vehicle comprising; a trailer chassis having a set of road wheels at one end thereof, an undercarriage having a set of road wheels at the opposite end thereof, a lower fifth wheel plate mounted upon said undercarriage, an upper fifth wheel plate mounted upon said trailer chassis, a king pin pivotally connecting said fifth wheel plates together, a load bearing ring interposed between said plates in concentric arrangement relative to said king pin, a pair of closure rings disposed concentrically on opposite sides around said load bearing ring, said load bearing ring being secured to one of said fifth wheel plates and said closure rings being secured to the other of said plates and movable relative to said load bearing ring, sealing rings disposed on opposite sides of said load bearing ring and in slidable sealing engagement with said closure rings, said sealing rings being interposed between the upper fifth wheel plate and said load bearing ring and being formed of a material adapted to dampen sound and vibration between the plate and the load bearing ring.

2. A four wheel trailer vehicle comprising; a chassis having a set of road wheels at one end thereof and a dolly at the opposite end, said dolly having a set of road wheels to support said chassis, an upper fifth wheel plate secured to the underside of said chassis, a lower fifth wheel plate secured to the upper surface of said dolly, a non-metallic load bearing ring interposed between said upper and lower fifth wheel plates, said load bearing ring being non-rotatably secured to said upper fifth wheel plate, said lower fifth wheel plate being formed of metal to provide an anti-friction bearing surface for said load bearing ring, a king pin connecting said upper and lower fifth wheel plates, said king pin being concentrically located relative to said load bearing ring to permit said lower fifth wheel plate to pivot relative to the load bearing ring and arranged to absorb radial thrust between said plates and non-metallic cushioning elements interposed between the upper fifth wheel plate and the load bearing ring adapted to maintain the load bearing ring in spaced relationship with respect to the upper fifth wheel plate and thereby absorb vibrations between the fifth wheel plate and load bearing ring.

3. A trailer vehicle comprising; a chassis having a pair of road wheels at one end thereof and having an undercarriage at its opposite end, an upper fifth wheel plate secured to the undersurface of said chassis, a lower fifth wheel plate secured to the upper surface of said undercarriage, a plurality of arcuate load bearing shoes secured to one of said plates, said arcuate shoes being disposed in a circumferential path in spaced relationship relative to each other to define a load bearing ring, a pair of inner and outer closure rings disposed in spaced relationship about the circumference of said load bearing ring, said closure rings being secured to the other of said plates and in sealing engagement with said load bearing ring to provide a lubricant reservoir on opposite sides thereof, and a plurality of radial grooves formed in the lower face of said load bearing shoes communicating at opposite ends with said lubricant reservoirs to distribute the lubricant contained therein.

4. A four wheel trailer vehicle comprising; a chassis having a pair of load bearing wheels at its rearward end and having a pivotally mounted dolly at its forward end, said dolly having a set of load bearing wheels to support the forward end of the chassis, an upper fifth wheel plate secured to the underside of said chassis, a lower fifth wheel plate secured to the upper surface of said dolly, a non-metallic load bearing ring interposed between said plates to support the vertical load of the trailer, a king pin disposed centrally of load bearing ring and connecting said upper and lower fifth wheel plates radially for pivotal movement of said lower plate relative to the upper, a pliable packing ring interposed between said load bearing ring and said upper fifth wheel plate to absorb vibrations between said plates, a draw bar connected to said dolly and, resilient connecting means between said dolly and said draw bar to absorb vibrations between said draw bar and said dolly.

5. A four wheel trailer vehicle comprising; a chassis having a pair of load bearing wheels at its rearward end and having a pivotally mounted dolly at its forward end, said dolly having a set of load bearing wheels to support the forward end of the chassis, an upper fifth wheel plate secured to the underside of said chassis, a lower fifth wheel plate secured to the upper surface of said dolly, a non-metallic load bearing ring interposed between said plates to support the vertical load of the trailer, a king pin disposed centrally of load bearing ring and connecting said upper and lower fifth wheel plates radially for pivotal movement of said lower plate relative to the upper, and a pliable packing ring interposed between said load bearing ring and said upper fifth wheel plate to absorb vibrations between said plates.

6. A four wheel trailer vehicle comprising; a trailer chassis having a set of road wheels at one end thereof, an undercarriage having a set of road wheels at the opposite end thereof, a fifth wheel plate mounted upon said undercarriage, a fifth wheel plate mounted upon said trailer chassis, a king pin pivotally connecting said fifth wheel plates together, a segmental non-metallic load bearing ring interposed between said plates in concentric arrangement relative to said king pin, a pair of closure rings disposed concentrically on opposite sides around said load bearing ring, said load bearing ring being secured to one of said fifth wheel plates and said closure rings being secured to the other of said plates, sealing rings disposed on opposite sides of said load bearing ring and in sliding sealing engagement with said closure rings, said sealing rings being formed of pliable material and interposed between one of said fifth wheel plates and the load bearing ring to maintain the load bearing ring in spaced relationship relative to the plate, and a plurality of bolts extending through said load bearing ring and said plate, said bolts adapted to secure the load bearing ring to the plate and to clamp the sealing rings therebetween to expand the sealing rings laterally into sealing engagement with said closure rings.

7. A four wheeled trailer vehicle comprising; a trailer chassis having a set of road wheels at one end thereof, an undercarriage having a set of road wheels at the opposite end thereof, said trailer chassis having an upper fifth wheel plate secured to its undersurface, said undercarriage having a lower fifth wheel plate secured to its upper surface, a king pin connecting said fifth wheel plates together to permit the undercarriage to pivot relative to the trailer chassis, a load bearing ring disposed between said fifth wheel plates to slidably sustain the trailer chassis relative to said lower fifth wheel plate, a latch bracket secured to one of said fifth wheel plates, a latch bolt slidably mounted in said bracket, the other of said fifth wheel plates having an aperture adapted to receive the end of said latch bolt to lock said undercarriage in a fixed position relative to said trailer chassis, said bracket having an inclined edge and said latch bolt having a lateral operating lever resting upon said edge and, spring means for urging said latch bolt and lever into engagement with said inclined edge.

JAMES J. BLACK.

REFERENCES CITED

The following references are of record in the file of this patent:

UNITED STATES PATENTS

| Number | Name | Date |
| --- | --- | --- |
| 96,898 | Decker | Nov. 16, 1869 |
| 1,078,801 | Munsing | Nov. 18, 1913 |
| 1,094,185 | Adams | Apr. 21, 1914 |
| 1,139,703 | Moxey | May 18, 1915 |
| 1,485,799 | Miner | Mar. 4, 1924 |
| 1,613,728 | Schneider et al. | Jan. 11, 1927 |
| 1,741,445 | Thompson et al. | Dec. 31, 1929 |
| 1,743,436 | Davis et al. | Jan. 14, 1930 |

FOREIGN PATENTS

| Number | Country | Date |
| --- | --- | --- |
| 214,070 | Switzerland | Mar. 31, 1941 |